United States Patent [19]

Shonaka

[11] Patent Number: 4,809,280

[45] Date of Patent: Feb. 28, 1989

[54] MICROCOMPUTER SYSTEM WITH WATCHDOG TIMER

[75] Inventor: Hisashi Shonaka, Kyoto, Japan

[73] Assignee: Omron Tateisi Electronics Co., Kyoto, Japan

[21] Appl. No.: 136,442

[22] Filed: Dec. 17, 1987

Related U.S. Application Data

[63] Continuation of Ser. No. 743,658, Jun. 11, 1985, abandoned.

[30] Foreign Application Priority Data

Jun. 12, 1984 [JP]  Japan .................. 59-120583

[51] Int. Cl.$^4$ ............................... G06F 11/00
[52] U.S. Cl. ............................... 371/62; 364/200
[58] Field of Search .................. 371/3, 62; 364/200 MS File, 900 MS File

[56] References Cited

U.S. PATENT DOCUMENTS

| | | | |
|---|---|---|---|
| 4,263,647 | 4/1981 | Merrell et al. | 364/136 |
| 4,414,623 | 11/1983 | Davis et al. | 364/200 |
| 4,538,273 | 8/1985 | Lasser | 371/62 |
| 4,566,111 | 1/1986 | Tanagawa | 377/28 |
| 4,570,217 | 2/1986 | Allen et al. | 364/188 |
| 4,586,179 | 4/1986 | Sirazi et al. | 371/12 |
| 4,618,953 | 10/1986 | Daniels et al. | 371/12 |
| 4,627,060 | 12/1986 | Huang et al. | 371/62 |

Primary Examiner—Gareth D. Shaw
Assistant Examiner—Maria Napiorkowski
Attorney, Agent, or Firm—Stevens, Davis, Miller & Mosher

[57] ABSTRACT

A microcomputer executes a certain system program with a microprocessor according to a certain system clock. The microcomputer includes a watchdog timer circuit provided external to the microcomputer which counts a certain time interval by counting a certain timer clock which is separate from the system clock with a counter for a certain count and, upon completion of the counting, forcibly resets the microprocessor of the microcomputer. The system program of the microprocessor has a step of producing a reset output to the counter before a predetermined time only when the system action is normal. There is provided a timer circuit which counts the system clock of the microcomputer with a certain counter for a certain number of counts, counting a time interval which is slightly longer than the normal period of the timer clock of the watchdog timer circuit, and upon completion of the counting interrupts the microprocessor of the microcomputer. The system program of the microcomputer has a step in which reset output is supplied to the counter of the timer circuit in a repeated manner according to the monitoring result of the timer clock of the watchdog timer so as to respond to either the rise or the fall of the timer clock, and a step in which an abnormal output is produced to the outside in response to the interruption from the timer circuit. Thereby, the operation of the microcomputer and of the watchdog timer can be effectively checked and monitored.

2 Claims, 4 Drawing Sheets

MICROCOMPUTER SYSTEM WITH WATCHDOG TIMER

This application is a continuation of application Ser. No. 743,658, filed June 11, 1985, now abandoned.

BACKGROUND OF THE INVENTION

The present invention relates to a microcomputer system with a watchdog timer, and in particular to such a microcomputer system with watchdog timer which incorporates a safety enhancing system for detecting faults in the hardware of the system.

In a conventional microcomputer system, a watchdog timer of a per se known sort is provided externally to the microcomputer, and the clock signal source for the watchdog timer circuit is provided separately from the system clock of the microcomputer, so that, in the event of any failure in the clock signal source for the system clock, the watchdog timer circuit may be able to detect any failure in the hardware of the microcomputer. However, in such a per se conventional system, because the clock signal source of the watchdog timer circuit is independent from the system clock signal source, in the event of a failure of the clock signal source and/or the counter of the watchdog timer circuit, it is impossible to detect the fact from the outside of the system, i.e., by the user. As a result, even if the clock signal source and the counter unit of the watchdog timer circuit should fail, the microcomputer keeps on operating independently from it, and therefore, even if the microcomputer should run wild, i.e. the system should run into a certain locked cycle or should not behave normally, due to any failure in the system, the watchdog timer circuit cannot stop it.

Therefore, in Japanese Patent Application No. 59-78061, which was filed on Apr. 18, 1984, and which it is not hereby intended to admit as prior art to this application except to the extent otherwise required by law, the assignee of the present patent application, as Japanese applicant, proposed to include a process in the system program of the microcomputer for monitoring the timer clock of the watchdog timer circuit and in case of any abnormal behavior thereof for producing an output to the outside indicating such an occurrence.

With such a construction, in the case of any failure in the watchdog timer circuit, the microcomputer can detect it, and the safety in case of any failure in the hardware of the system may be enhanced.

However, according to such a construction, a monitoring clock source is provided for the watchdog timer separately from the clock source from the system clock, and there is a problem that, should this monitoring clock source fail, even when the system action of the microcomputer is normal, it becomes impossible to detect any abnormality of the watchdog timer circuit.

SUMMARY OF THE INVENTION

Accordingly, it is the primary object of the present invention to provide a microcomputer system, equipped with a watchdog timer failure detecting function, which has improved reliability.

According to the most general aspect of the present invention, these and other objects are accomplished by a microcomputer system, comprising: (a) a microcomputer comprising: (i) a microprocessor means; and (ii) a system clock; (b) a watchdog timer circuit external to said microcomputer comprising: (i) a timer clock, different from said system clock; (ii) a counter; and (iii) a means for counting a certain first time interval by counting said timer clock using said counter up to a certain limit value, and for, upon completion of said counting, forcibly resetting said microprocessor means of said microcomputer; and (c) a timer circuit means, comprising a counter, for counting said system clock of said microcomputer by using said counter up to a certain limit value, so as to determine a certain second time interval which is slightly longer than said first time interval, and for, upon completion of said counting, forcibly resetting said microprocessor means of said microcomputer; (d) said microprocessor means operating according to a system program for: (i) only when the operation of the system is normal, producing a reset output to said counter of said watchdog timer circuit before a predetermined time; (ii) supplying reset output to said counter of said timer circuit means in a repeated manner according to the monitoring result of said timer clock of said watchdog timer, so as to respond either to the rise or to the fall of said timer clock; and (iii) producing an abnormal indication to the outside, in response to interruption from said timer circuit.

According to such a structure, should the watchdog timer fail, as long as the system operation of the microcomputer is in progress, owing to the action described above, an interrupt is made from the timer circuit to the microcomputer, and the microcomputer can produce an abnormal output to the outside in response to this interrupt.

Because when the clock signal source of the timer circuit itself has failed the microcomputer itself also fails at the same time, then it is possible to reset the microprocessor with the watchdog timer circuit as before. As a result, the reliability of the microcomputer system equipped with this type of watchdog timer failure detection function may be substantially improved.

BRIEF DESCRIPTION OF THE DRAWINGS

The present invention will now be shown and described with reference to the preferred embodiment thereof, and with reference to the illustrative drawings. It should be clearly understood, however, that the described embodiment, and the drawings, are given purely for purposes of explanation and exemplification only, and are not intended to limit the scope of the present invention in any way, since the scope of the present invention is to be defined solely by the legitimate and proper scope of the appended claim. In the drawings, like parts and spaces and so on are denoted by like reference symbols in the various figures thereof; in the description, spatial terms are to be everywhere understood in terms of the relevant figure; and:

DESCRIPTION OF THE PREFERRED EMBODIMENT

Figure 1:
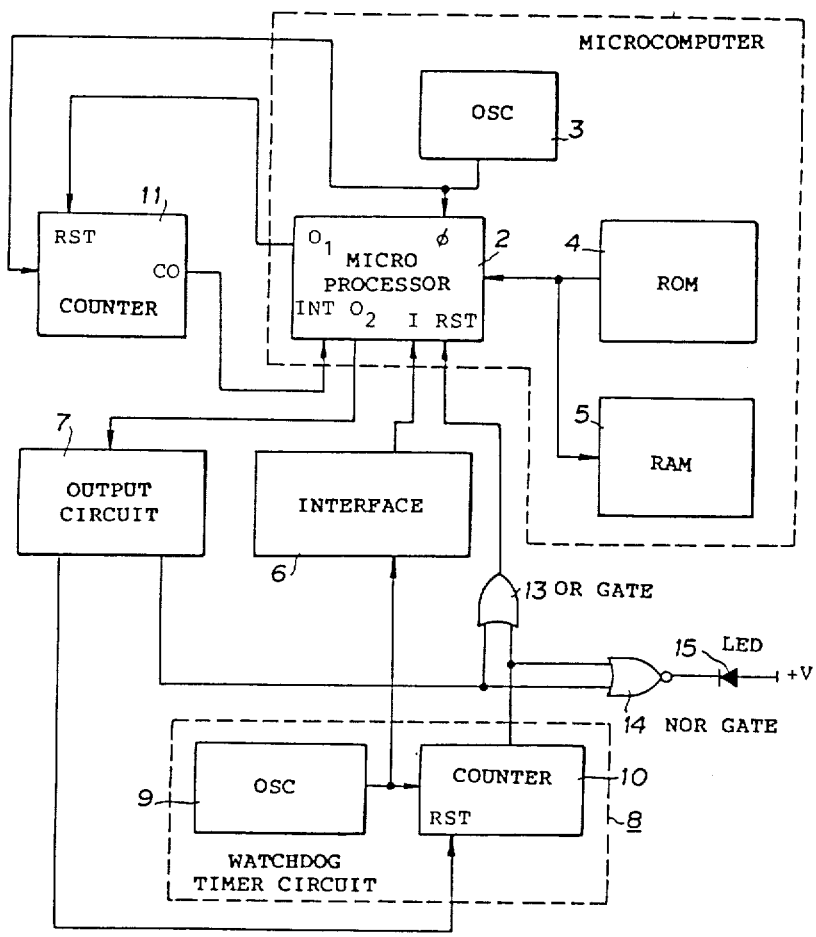
FIG. 1 is a block diagram schematically showing the overall structure of the microcomputer system with watchdog timer which is the preferred embodiment of the present invention.

The present invention will now be described with reference to the preferred embodiment thereof, and with reference to the appended drawings. FIG. 1 is a block diagram schematically showing the overall structure of the microcomputer system with watchdog timer which is the preferred embodiment of the present invention. In this figure, the reference numeral 1 denotes the microcomputer as a whole, and this microcomputer 1 includes a microprocessor 2 which operates according to a certain system clock of an internal oscillating circuit (OSC) 3. Further the microcomputer 1 comprises a ROM 4 and a RAM 5.

The ROM 4 stores the system programs which are executed by the microprocessor 2, and also stores various constant data therefor and so on, while the RAM 5 is used for holding various variables and data which alter during the operation of the program, in a per se known way.

External to the microcomputer 1 (which can be regarded as the center of the system), there are provided an external interface 6 to which an external input signal is supplied, an an output circuit 7 for outputting an output signal to the outside. Further, there is provided a watchdog timer circuit 8 which has an oscillating circuit (OSC) 9 and a counter 10, and there are also provided another counter 11, an OR gate 13, a NOR gate 14, and a light emitting diode (LED) 15.

The watchdog timer 8 is for forcibly resetting the microprocessor 2 in the event of any hardware failure in the microcomputer 1 or in the event of the running wild of the program, and the oscillating circuit 9 of this watchdog timer circuit 8 produces clock pulses independently from the system clock of the microprocessor 2, while the counter 10 is repeatedly reset without completing its counting up to a certain predetermined value, as long as the microcomputer 1 is operating normally.

In other words, the system program stored in the ROM and obeyed by the microprocessor 2 includes a process step in which a reset output signal is supplied to the counter 10 of the watchdog timer circuit 8 before the expiration of a certain predetermined time interval, as long as the operation of the system is normal.

On the other hand, in order to detect any failure of the watchdog timer circuit 8 with the microcomputer 1, a counter 11 sharing the internal oscillating circuit 3 is provided so as to form a timer circuit for watching the watchdog timer, and there are provided a process step in which the counter 11 of the timer circuit is reset and a process step in which an output signal denoting abnormal operation is produced to the outside.

Figure 3:
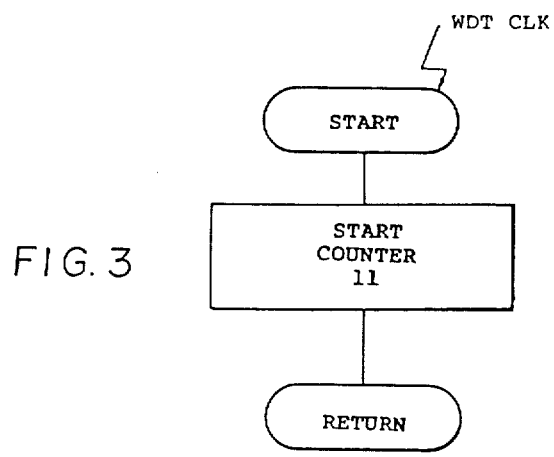
FIG. 3 is a flow chart for explaining the operation of the microcomputer system, during an interrupt caused by the rise or fall of a clock signal.
Figure 4:
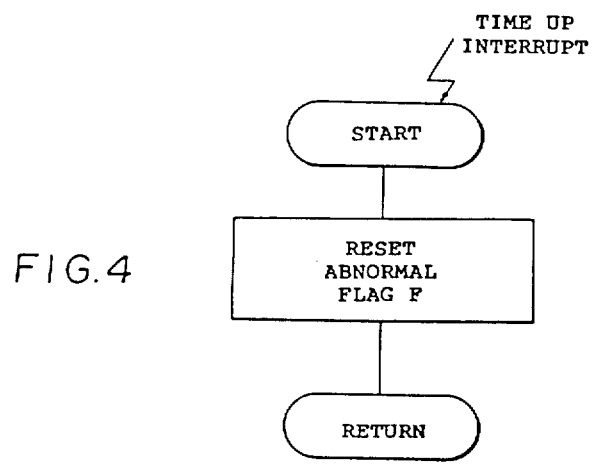
FIG. 4 is a flow chart for explaining the operation of the microcomputer system, during a time up interrupt.

Now, the action of this preferred embodiment of the microcomputer system with watchdog timer of the present invention will be described in the following in regards to these process steps, with reference to the flow charts of program operation which are given in FIGS. 2 to 4.

Figure 2:
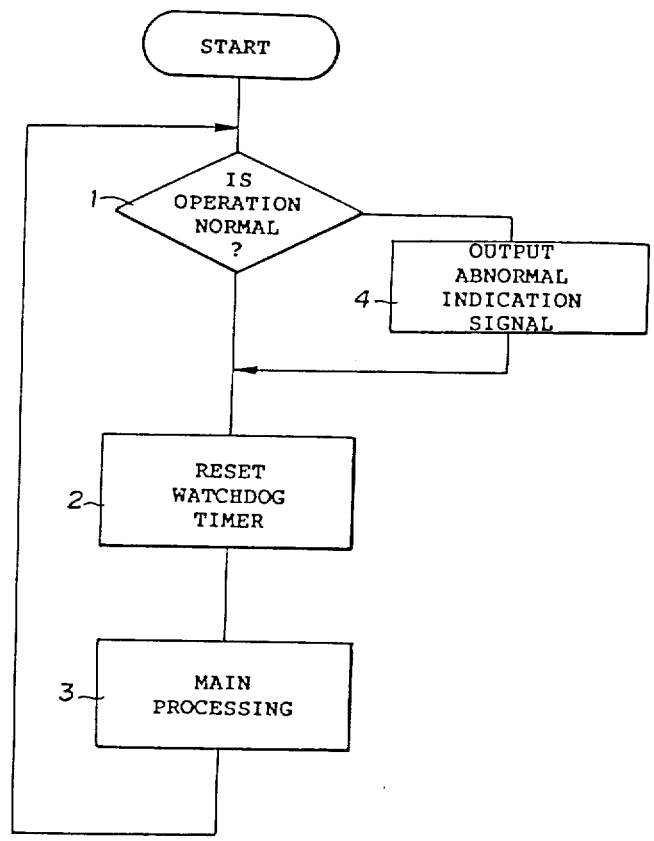
FIG. 2 is a flow chart for explaining the operation of the microcomputer system, during its usual operation.

First referring to the FIG. 2 flow chart, after the START block, in the step 1, whether or not any hardware failure has occurred in the microcomputer 1 is determined, depending upon whether a certain abnormal operation flag F has been set, or not; i.e., the decision is made as to whether or not operation of the microcomputer 1 is normal. If the result of this decision is YES, then the flow of control passes to the step 2, in which a reset pulse is outputted from the output circuit 7 of the microcomputer 1 to the counter 10 of the watchdog timer, and thereby the watchdog timer counter 10 is reset before it has completed its counting.

Next, the flow of control passes on to the step 3, in which the main processing routine of the microcomputer 1 is performed—for instance this may be execution of a programmable controller program, in the case that the system is in fact a programmable controller. And then the flow of control is cycled round to the decision step 1 again, to repeat the steps 1 through 3 as described above, as long as the abnormal flag F is in the reset state.

On the other hand, if the operation of the program of the microcomputer 1 has gone into a perpetual loop condition, or said program operation has completely stopped, so that the step 2 is not going to be executed, then the watchdog timer circuit 8 times up (reaches its count value) and causes the resetting of the microprocessor 2.

Meanwhile, in the microprocessor 2, the clock pulses of the oscillating circuit 9 of the watchdog timer circuit 8 are always being monitored by way of the interface 6, and an interrupt signal is supplied from the interface 6 in synchronization with the rise or the fall of these clock pulses. Then, as shown in the flow chart of FIG. 3, a timer initiation process is activated every time an interrupt occurs, and the counter 11 is repeatedly reset.

It should be particularly noted that the value of count completion of the counter 11 or the time up time T2 of the counter 11 is designed to be slightly longer than the normal period of the clock 9 of the watchdog timer 8.

Figure 5:
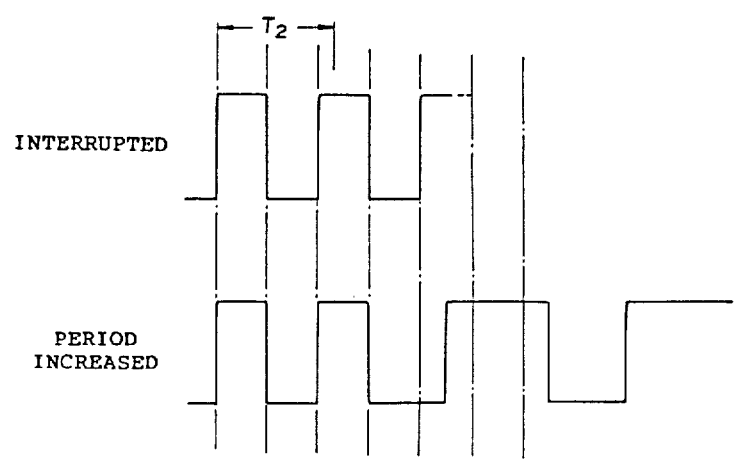
FIG. 5 is a timing chart for aiding with the understanding of the flow charts of FIGS. 2 through 4.

Therefore, if the oscillating circuit 9 has stopped, as shown in the wave form diagram of FIG. 5 for instance, or the oscillating period has extended due to changes in the ambient temperature or the like, also as shown in the wave form diagram of FIG. 5, then a time up output is produced from the counter 11 before the counter 11 is reset. Then, as shown in the flow chart of FIG. 4, the abnormal flag F is set by the timer processing.

Once the abnormal flag F is thus set, in the main processing shown in FIG. 2, the result of the decision step 1 becomes NO, and the flow of control is directed to the succeeding step 4, in which a high output is produced from the output circuit 7, whereby the light emitting diode 15 is driven by way of the NOR gate 14 so as to indicate an abnormal state to the outside, i.e. to the user.

And at the same time the abnormal high output obtained from the output circuit 7 is also supplied to the reset terminal RST of the microprocessor 2 by way of the OR gate 13, thereby forcibly resetting the microprocessor 2.

Thus, according to this shown preferred embodiment of the present invention, should any failure develop in the microcomputer 1, the action of the microcomputer 1 is forcibly terminated by the action of the watchdog timer circuit 8, and it is so indicated to the outside by lighting up the light emitting diode 15 at the same time.

Further, should the watchdog timer circuit 8 itself fail, a timer output is produced from the counter 11, and in response thereto an abnormal output produced from the microcomputer 1 terminates its own action in a forcible manner, and it is so indicated to the outside by lighting up the light emitting diode 15.

Therefore, it becomes possible to prevent the dangerous state of affairs in which the microcomputer 1 continues its operation without knowing the failure of the watchdog timer circuit 8 and then the microcomputer 1 becomes faulty.

When the internal oscillating circuit 3 serving as an oscillating source for the timer circuit has failed, because the system action of the microcomputer 1 becomes abnormal at the same time, the microprocessor 2 is forcibly reset by the time up output of the watchdog timer circuit 8.

With the recent developments in microprocessors, a counter 11 is often incorporated into the microprocessor 2, and in such a case the safety of the hardware of the system can be even more enhanced.

The application of this invention is not limited to a programmable controller, but as a matter of course extends to various microprocessor applied devices such as personal computers, word processors, and so on. And in the above described embodiment, a light emitting diode was used to indicate a failure, but it is also possible to use a buzzer sound or other means which appeal to the visual sense, and it is also possible to forcibly reset the microprocessor by itself by incorporating a circuit for forcibly resetting itself into the microprocessor itself. Therefore, although the present invention has been shown and described with reference to the preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore, it is desired that the scope of the present invention, and of the protection sought to be granted by Letters Patent, should be defined not by any of the perhaps purely fortuitous details of the shown preferred embodiment, or of the drawings, but solely by the scope of the appended claim, which follows.

What is claimed is:

1. A microcomputer system, comprising:
   (a) an abnormal state display means,
   (b) a microcomputer comprising:
      (i) a microprocessor means, and
      (ii) a system clock means for producing system clock signals,
   (c) a watchdog timer circuit external to the microcomputer comprising:
      (i) a timer clock, different from said system clock means, for producing timer clock signals,
      (ii) a counter means for receiving and counting said timer clock signals, and upon reaching a first predetermined count indicating passage of a first time interval since reset of said watchdog timer circuit, causing forcible reset of said microprocessor means,
   (d) a timer circuit means including a counter receiving and counting said system clock signals, and upon reaching a second predetermined count indicating passage of a second time interval since reset of said timer circuit means, causing one of (i) forcible resetting of said microprocessor means and (ii) activation of said abnormal state display means,
   (e) said microprocessor means comprising means for:
      (i) detecting, in cooperation with said timer circuit means, whether an abnormal condition exists in said watchdog timer circuit and generating an abnormal condition signal in response to a detection of an abnormal condition,
      (ii) causing a reset output signal to be supplied to said counter means of said watchdog timer circuit prior to said counter means reaching said first predetermined count, unless a said abnormal condition signal has been generated,
      (iii) in response to occurrence of each of said timer clock signals of said watchdog timer circuit, supplying repeated reset output signals to said counter of said timer circuit means to reset said timer circuit means to prevent its counter from reaching said second predetermined count, and
      (iv) stopping supplying of said repeated reset output signal to said counter of said timer circuit means in response to detection of said abnormal condition existing in said watchdog timer circuit, said counter of said timer circuit means reaching said second predetermined count in an absence of receipt of one of said repeated reset output signals during said second time interval.

2. The microcomputer system as in claim 1, wherein said microprocessor means comprises means, responsive to an interruption in occurrence of said timer clock signals from said timer clock of said watchdog timer circuit, for providing a signal causing activation of said abnormal state display means and reset of said microprocessor means.

* * * * *